(12) United States Patent
Ming

(10) Patent No.: US 7,156,405 B1
(45) Date of Patent: Jan. 2, 2007

(54) FOLDING SCOOTER

(76) Inventor: James Wong Ka Ming, Flat G, 7/F, Blak A, Marvel Building, 25-31 Kwai Fung Crescent, Kwai Chung (HK)

( * ) Notice: Subject to any disclaimer, the term of this patent is extended or adjusted under 35 U.S.C. 154(b) by 0 days.

(21) Appl. No.: 11/249,877

(22) Filed: Oct. 13, 2005

(51) Int. Cl.
B62M 1/00 (2006.01)

(52) U.S. Cl. .............................. 280/87.05; 280/87.041; 280/278; 280/287

(58) Field of Classification Search .......... 280/87.041, 280/287, 278, 87.05
See application file for complete search history.

(56) References Cited

U.S. PATENT DOCUMENTS

| 5,848,660 | A | * | 12/1998 | McGreen | 180/206 |
| 6,158,751 | A | * | 12/2000 | Wu et al. | 280/87.041 |
| 6,182,988 | B1 | * | 2/2001 | Wu | 280/87.05 |
| 6,206,387 | B1 | | 3/2001 | Tsai | |
| 6,234,501 | B1 | | 5/2001 | Chen | |
| 6,276,701 | B1 | | 8/2001 | Chen | |
| 6,305,698 | B1 | * | 10/2001 | Liang | 280/87.041 |
| 6,317,923 | B1 | * | 11/2001 | Lo | 16/110.1 |
| 6,378,880 | B1 | * | 4/2002 | Lin | 280/87.05 |
| 6,390,483 | B1 | * | 5/2002 | Hsu et al. | 280/87.041 |
| 6,428,021 | B1 | * | 8/2002 | Tung | 280/87.041 |
| 6,431,567 | B1 | * | 8/2002 | Tsai | 280/87.041 |
| 7,011,319 | B1 | * | 3/2006 | Lu | 280/87.041 |
| 2003/0067132 | A1 | * | 4/2003 | Lin | 280/87.041 |

* cited by examiner

Primary Examiner—J. Allen Shriver
Assistant Examiner—John Walters

(57) ABSTRACT

A foldable two wheeled scooter includes a steering post with a front wheel at a lower end and handlebars at an upper end. A support tube connects with a folding mechanism enclosed in a protective housing and supportively connects with a running board having a rear wheel. The protective housing prevents a user from being harmed when moving the scooter from an upright position to a folded down position.

5 Claims, 6 Drawing Sheets

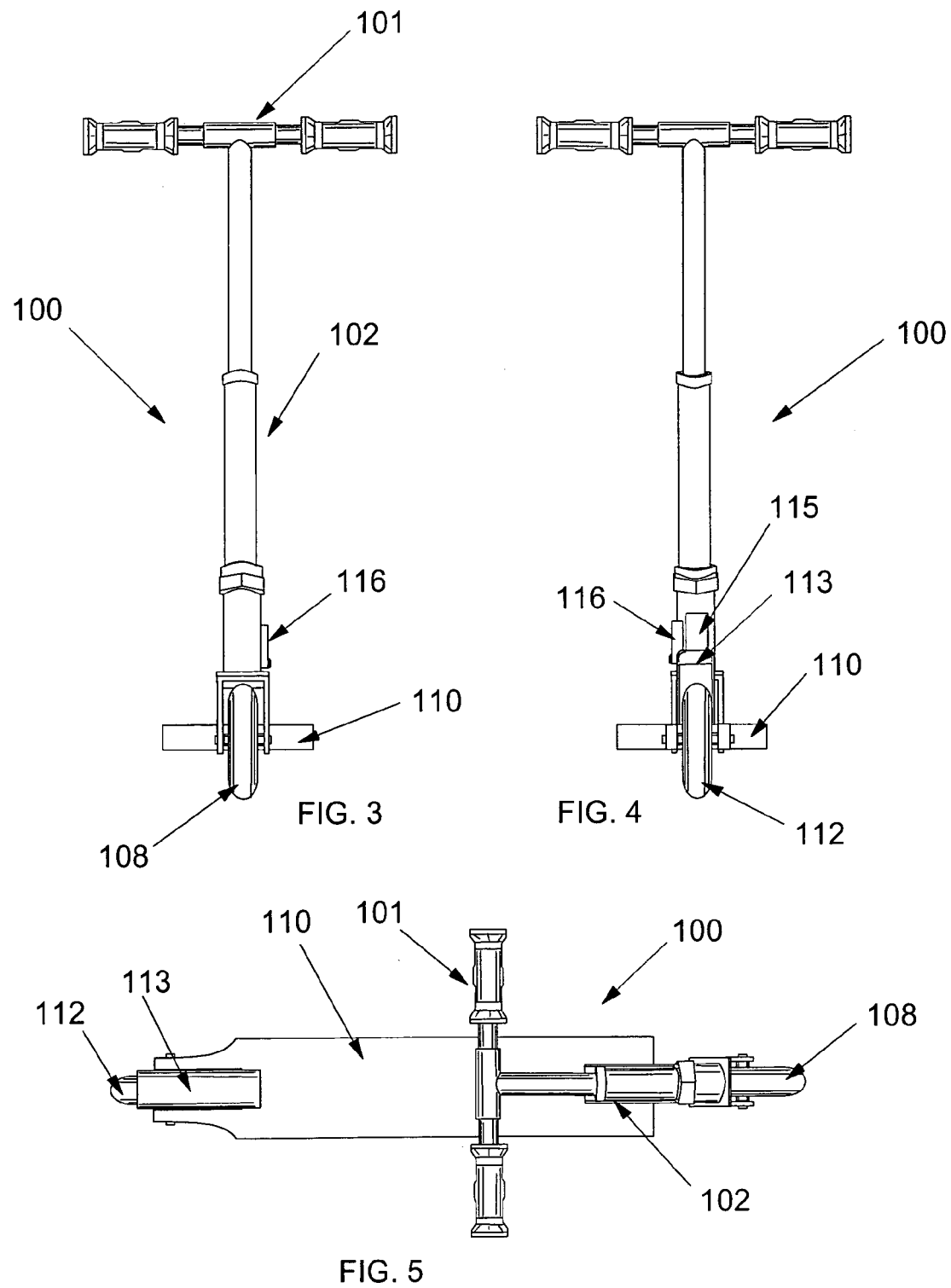

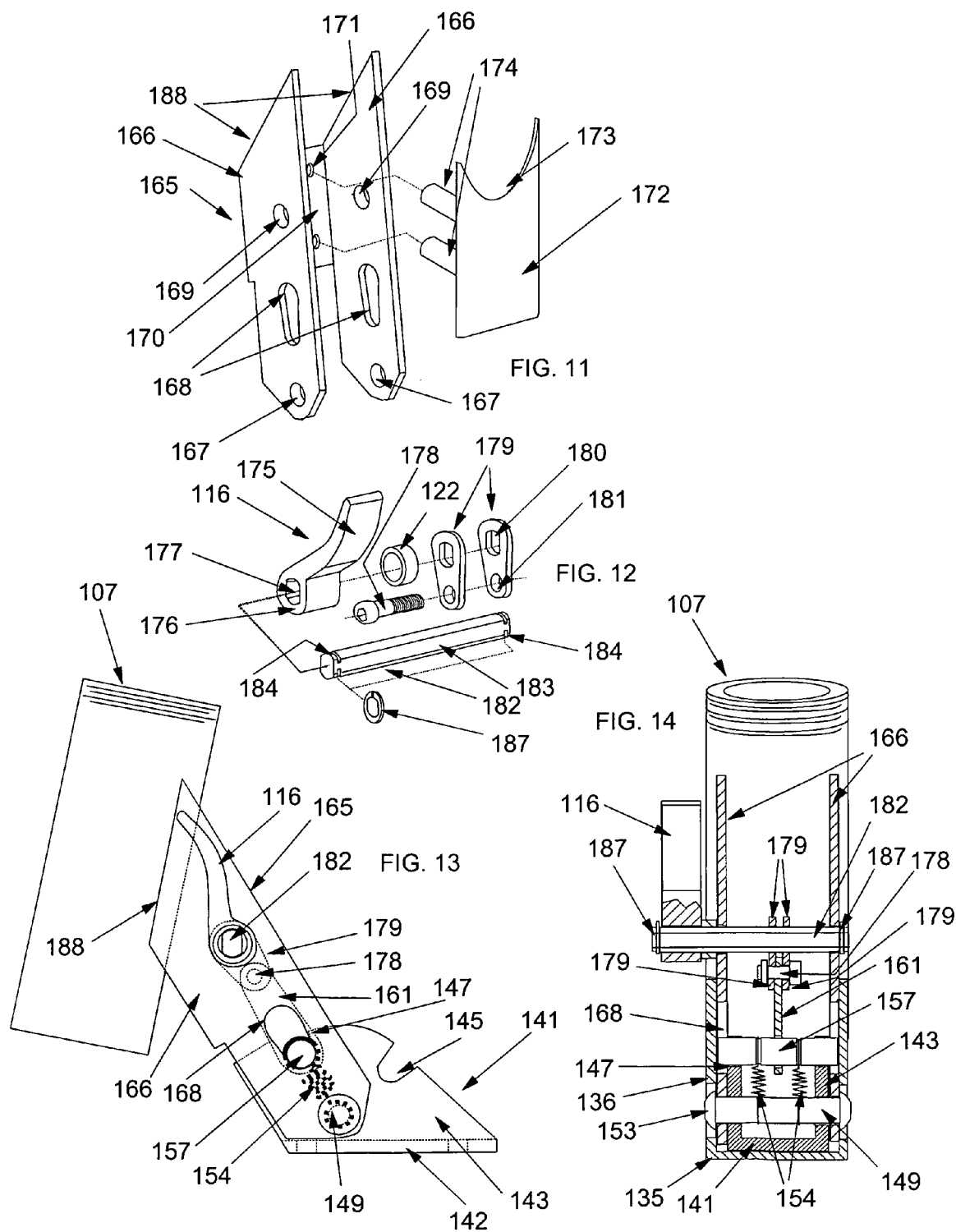

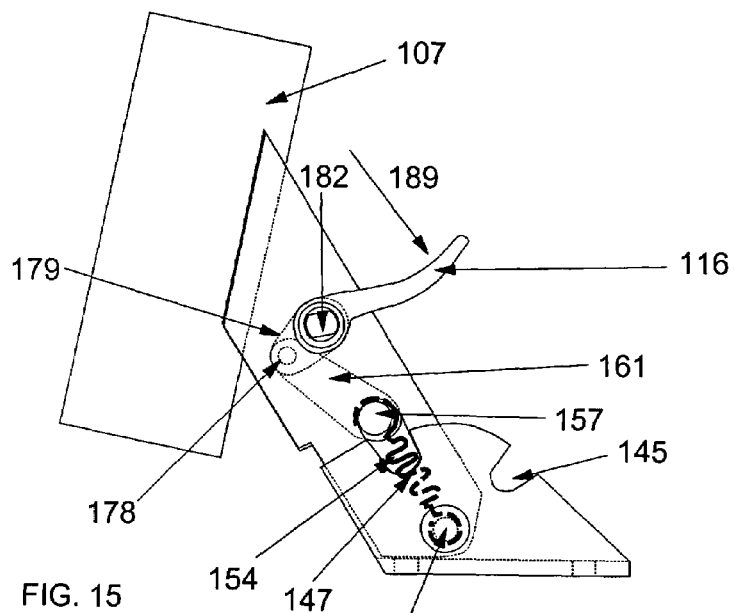
FIG. 15
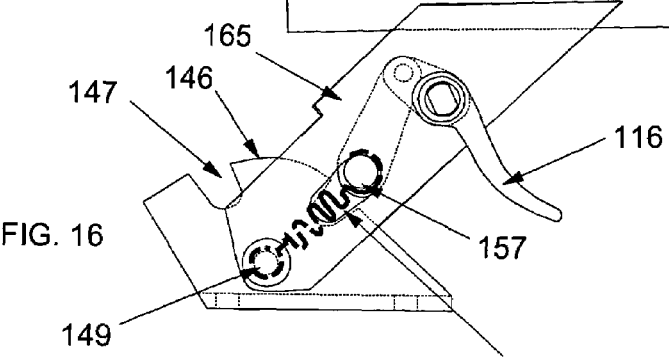
FIG. 16
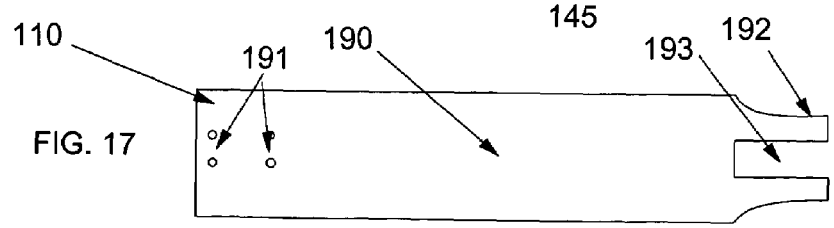
FIG. 17 ered as a recreational device. A relatively long running board is supported above a running surface by two wheels attached at ends of the board. The two wheels are aligned so that the board can be rolled forward. To provide necessary stability of the overall structure when rolling forward, a steering post must be fixed at a front end and rise to the level of a rider's hands. A handlebar is fixed to a top end of the steering post so a user can grasp the ends of said handlebar to stabilize and guide the scooter in a forward direction. A front wheel is typically connected with the steering post by a steering mechanism so that a direction of the front wheel changes upon a rider's moving the handlebars about an axis formed by the steering post.

FOLDING SCOOTER

FIELD OF THE INVENTION

The present invention relates to two wheeled scooters which collapse or fold from an upright position to a folded down position for carrying or storage.

BACKGROUND OF THE INVENTION

Two wheeled scooters have long been known as a recreational device. A relatively long running board is supported above a running surface by two wheels attached at ends of the board. The two wheels are aligned so that the board can be rolled forward. To provide necessary stability of the overall structure when rolling forward, a steering post must be fixed at a front end and rise to the level of a rider's hands. A handlebar is fixed to a top end of the steering post so a user can grasp the ends of said handlebar to stabilize and guide the scooter in a forward direction. A front wheel is typically connected with the steering post by a steering mechanism so that a direction of the front wheel changes upon a rider's moving the handlebars about an axis formed by the steering post.

The structure of scooter described above necessarily results in an L-shaped device, where the running board and wheels form one part of the "L" and the steering post and handlebars form the other part of the "L". Since scooters typically are used only occasionally, it has long been known that storage of said scooters present a unique problem as an L-shaped device. It has also been long known to provide mechanisms to that the L-shaped structure could be in some manner disassembled or folded to reduce the storage difficulties of said scooters.

While it would appear most desirable that an L-shaped device such as the two wheeled scooter should be provided with folding means located at the vertex of its L-shape, that vertex location is the place most challenging to incorporate such folding means. The vertex of the L-shape of a two wheeled scooter is the part of its structure which must be designed most sturdily so that it does not fail in use. If the steering post of a two wheeled scooter bends or breaks, a rider moving even at moderate speeds can be seriously hurt. Folding means incorporated at the vertex location have in the past introduced serious flaws in the scooter's structure, many of which could result in structural failure during use.

In addition to structural failure, prior art folding means for two wheeled scooters have incorporated an inherently dangerous feature. The act of folding the L-shape of the device clearly involves moving a relatively heavy steering post with unwieldy handlebars down from an upright position toward a top surface of the running board. The act of releasing the steering post from the upright position in prior art folding means often brings a user's hands near to the vertex location. In any case, a user's hands or feet may inadvertently be found in the path of the collapsing steering post and/or handlebars when the scooter is being folded down. In such a case, many prior art folding means do not adequately protect the user from injury during the collapsing or folding operation. A user's finger or toes in many prior art devices be trapped and/or crushed in the folding operation.

U.S. Pat. No. 6,276,701 discloses a folding means for said scooters. It is clear the folding means permit a user to inadvertently place one or more fingers inside opposing armatures or flanges that scissor together in the folding operation.

U.S. Pat. No. 6,206,387 discloses another folding means for said scooters. The mechanism shown includes a structure wherein the steering post folds down to the level of the running board for carrying or storage. The folding means is shown as an open framework of the dangerous scissoring flanges and armatures described above. No protective measures are shown or described that would protect a user from inadvertent injury.

U.S. Pat. No. 6,234,501 discloses yet another folding means for said scooters. The mechanism shown includes a structure wherein the steering post folds down to the level of the running board for carrying or storage. The folding means is shown as an open framework of the dangerous scissoring flanges and armatures described above. No protective measures are shown or described that would protect a user from inadvertent injury.

There is a need for a folding means for a two wheeled scooter with excellent structural integrity while providing easy release for the steering post from an upright position and protecting the user from harm during the folding operation.

SUMMARY OF THE INVENTION

The present invention is a folding scooter having folding means that incorporate a protective housing and release means with a lever-rotatable polygonal pin for releaseably securing a steering post in an upright position. Said polygonal pin virtually eliminates the possibility of wearing out said release means by repeated use.

The present invention is adapted to withstand the wear and tear typical of two wheeled scooters. Users often weigh much more than what would be typical of a child's weight, i.e., adults or very overweight teens will use a two wheeled scooter. User's often operate their scooters at high speeds down steep inclines or over very rough terrain. Under these extreme circumstances, the folding means must remain secure and also easily releaseable from an upright position for many years of hard use.

The present invention comprises a running board with a rear wheel supported from a rear wheel axle supported from a pair of rear wheel flanges extending rearward from a rear end of the running board. At a front end of the running board, a protective housing comprises an upside down and U-shaped base piece with a bottom plate and side flanges which is secured to a top and front surface of the running board at the bottom plate. Upward facing side flanges of the base piece are enclosed by a slotted roof piece.

Secured to an upward facing surface of the bottom plate and located between the flanges of the base piece is a second upside down U-shaped piece, a lower latch piece that comprises another bottom plate and side flanges directed upward. The side flanges of the lower latch piece have two sets of aligned notches on upper edges adapted to removeably receive a horizontal latch pin. The latch pin is urged into a set of aligned notches by means of springs connecting a mid section of the latch pin with a base pine fixed in the lower latch piece. A horizontal base pin is secured in aligned holes in the side flanges of the base piece and the lower latch piece. When the lower latch piece is secured to the base piece, two narrow upper latch piece spaces are formed between inner surfaces of the side flanges of the base piece and outer surfaces of the side flanges of the lower latch piece.

Secured at a lower end by the base pin within the upper latch piece spaces a third U-shaped piece, an upper latch piece comprises another bottom plate and side flanges. The concave side of the upper latch piece is directed rearward so that a top surface of the bottom plate always faces a rider when the steering post is in an upright position. Engaging ends of the side flanges of the upper latch piece fit into the two narrow upper latch piece spaces so that the base pin can secure together the base piece, the lower latch piece and the upper latch piece. The upper latch piece is rotatable about the base pin from the engaging ends.

The upper latch piece connects at a post support end with a lower portion of a steering post. The steering post extends downward from the upper latch piece connection to support the axle of a front wheel and extends upward from the upper latch piece connection to support handlebars for a user.

A middle part of the upper latch piece comprises two aligned latch pin slots opposite one another on the side flanges. These latch pin slots are further aligned with the aligned notches on the side flanges of the lower latch piece when the scooter steering post is in the upright position or in the folded down position. A latch pin is at all times fixed so that its ends are always adjacent to inside surfaces of the side flanges of the base piece and are guided by the latch pin slots. The latch pin is always urged toward the base pin by a pair of strong springs, so that said latch pin is fixed at a lowest position in forward aligned notches on the side flanges of the lower latch piece in the upright position and is further fixed in rear aligned notches in the side flanges of the lower latch piece in the folded down position.

A lifter end of the upper latch piece, distal to the engaging end, comprises a polygonal rotating pin that is rotatably fixed across the concavity of the side flanges and extends through one side flange to support a lever accessible to a user. A dual armature extends from the rotating pin which supports an upper cable end. The upper cable end is connected to, in an upright position, a downward extending cable. A lower cable end of the cable is fixed in a mid section of the lifter pin. When a user depresses the lever from an upward to a downward position and the steering post is in the upright position, the dual armature moves the upper cable end upward, thereby lifting the latch pin from the front aligned notches. The latch pin is restrained in its movement so that it may travel only along the path defined by the latch pin slots. However, latch pin slots are dimensioned so that when the latch pin is lifted from the front aligned notches, the upper latch piece may rotate rearward about the base pin so that the steering post is moved into a folded down position. When the steering post reaches the folded down position, a user may reverse their previous action on the lever to release the latch pin into a fixed position in the rear aligned notches on the lower latch piece.

The side flanges of the base piece and the slotted roof piece are critical to the invention. The side flanges of the base piece extend up from the top surface of the running board so that they at all times enclose outside facing openings of the latch pin slots and prevent a user from putting their fingers in said latch pin slots during the folding operations, either up or down. Enclosing said openings also prevents the latch pin from moving from its position with its ends engaged by the latch pin slots. The slotted roof piece covers the base pin, springs, and latch pin structures while having a single front to rear slot adapted to permit passage of the cable from the front to rear, and vice versa, in the folding operations. A further upper roof piece encloses the uncovered concavity of the U-shaped upper latch piece, thereby enclosing the cable, upper cable ends, armature and rotating pin. The combination of the base piece, the slotted roof piece, the upper latch piece, and the upper roof piece comprise an protective enclosure or housing for the folding means of the invention. A user cannot, even with diligent intent, insert their fingers or other body parts into the potentially harmful structure of the folding means.

The rotating pin comprises a polygonal structure. Flattened sides extend the length of the rotating pin so that when a user moves the lever from an upward to a downward position, the springs pulling down on the latch pin will in turn pull on the cable, armature and rotating pin to press a flattened side against flattened opening edges of the rotating pin openings in the side flanges of the upper latch piece. The mating flattened surfaces of the rotating pin and the rotating pin openings cause the latch pin to remain in a lifted position until a user moves the lever in the reverse direction. At that time, the latch pin is released from the lifted position and is urged into the front or rear notches or against top edges of the side flanges of the lower latch piece between said notches.

The steering post is topped with handlebars that extend laterally for a user to grasp. The handlebars are foldable so that they lie adjacent and parallel with the steering post in a storage position.

The invention scooter is capable of full and vigorous operation as if it were not capable of being reduced in size. However, in a folded down position, the steering post lies adjacent to the running board and, in a storage position, handlebars fold so that they lie adjacent and parallel with the steering post. The invention scooter is capable of being stored in a relatively small space and being carried easily.

One object of the invention is to provide a protection so a scooter user can safely fold their scooter down without fear of injury. The invention enclosure or housing prevents access to the inside of said housing by objects greater that about 5 millimeters so that user can not easily to put their finger into the folding means.

A further object of the invention is to provide an exceptionally strong structure with folding means. The steering post is connected to the running board via the upper latching piece secured directly to the base piece by the base pin. This structure provides exceptional resistance to ramming force upon the front wheel of the scooter with riders of up to and over 80 kilograms moving at a high rate of speed.

BRIEF DESCRIPTION OF THE DRAWINGS

FIGS. 1 through 5 are respectively left side, right side, front, rear and top views of the invention scooter in the upright position.

FIG. 11 is an exploded and perspective view of the upper latch piece and the upper roof piece.

FIG. 12 is an exploded and perspective view of the rotating pin, locking washer, short armatures, spacer, armature connecting pin and latch lever.

FIG. 13 is a side view of the device of FIG. 8 without a base piece and roof pieces.

FIG. 14 is a partially broken away and rear view of the device of FIG. 13 with the base piece.

FIG. 15 is the device of FIG. 13 with the latch lever depressed and the latch pin lifted from its securing notches.

FIG. 16 is the device of FIG. 15 moved from an upright position to a folded down position.

FIG. 17 is a top view of the running board.

DETAILED DESCRIPTION OF THE INVENTION

The invention is now discussed with reference to the figures.

Figure 1:
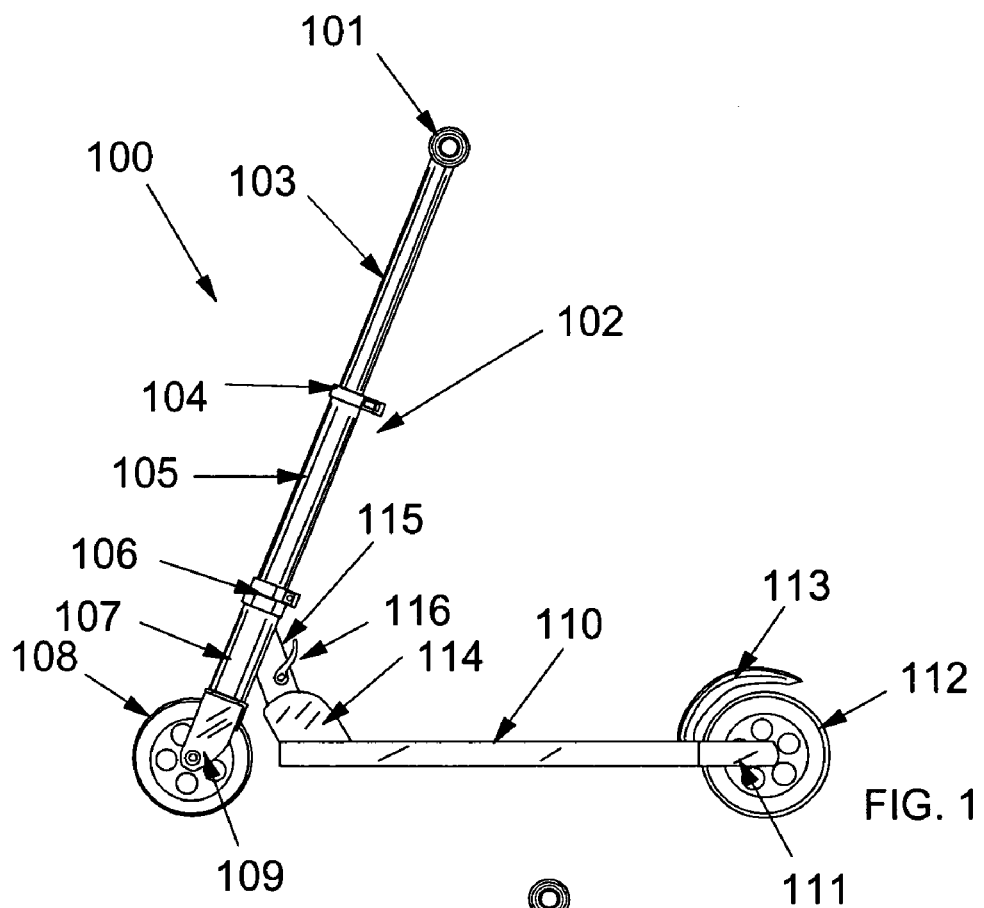
Figure 2:
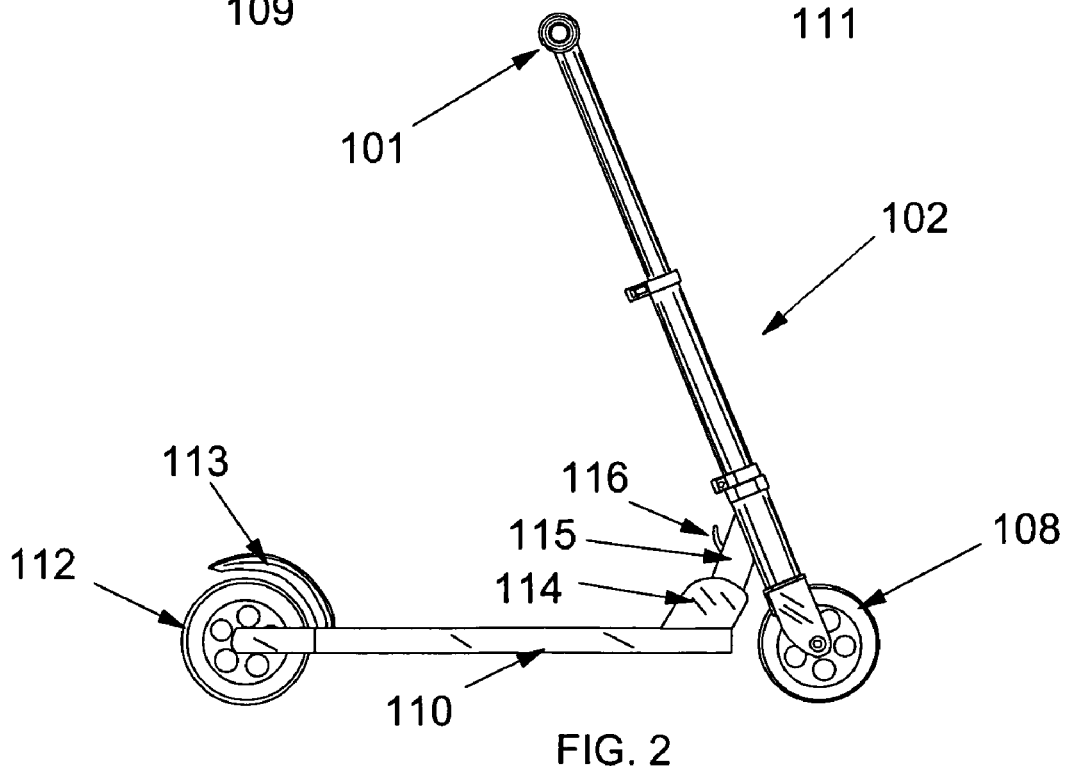

FIGS. 1 and 2 show the invention scooter 100 respectively from the left and right sides comprising handlebars 101 oriented normal to a normal running direction of the scooter. Handlebars 101 are secured to a top end of a telescopic steering post 102. Post 102 comprises a top tube 103 which is capable of being received into tube 105 upon release of band 104 to thereby reduce the length of steering column 102. Tube 105 extends through tube 107 to fix securely to a top part of axle support 109. A nut and band means 106 hold tube 105 in place relative to tube 107. Axle support 109 comprises a U-shaped piece with two opposing holes at lower ends through which pass and between which are rotatably fixed an axle of front wheel 108. Thus, rotating handlebars 101 cause front wheel 108 to respond in a like manner.

Running board 110 extends from a front to a rear part of scooter 100. At a rear part of board 110 extends fender 113 over wheel 112. Rear wheel 112 comprises an axle rotatably fixed in ends of board 110. Front wheel 108 and rear wheel 112 cooperate so that scooter 100 can roll on a horizontal surface. FIGS. 3, 4 and 5 respectively show front, rear and top views of scooter 100 in an upright position, as also shown in FIGS. 1 and 2.

Connecting board 110 to lower tube 105 are the folding means of the invention comprising piece 114 fixed to the running board 110 and piece 115 fixed to tube 107. Folding means comprise a protective housing around potentially dangerous parts when scooter 100 is moved from an upright to a folded down position.

Figure 6:
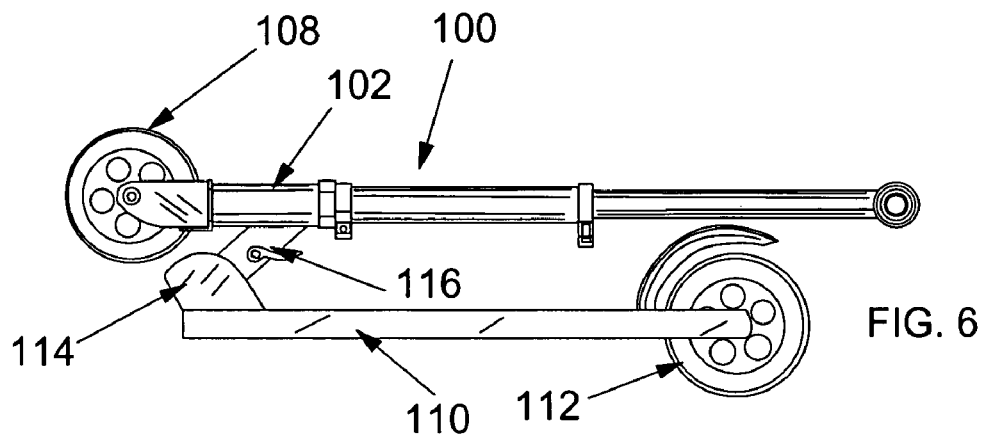
FIGS. 6 and 7 are respectively left side and top views of the invention scooter in the folded down position.
Figure 7:
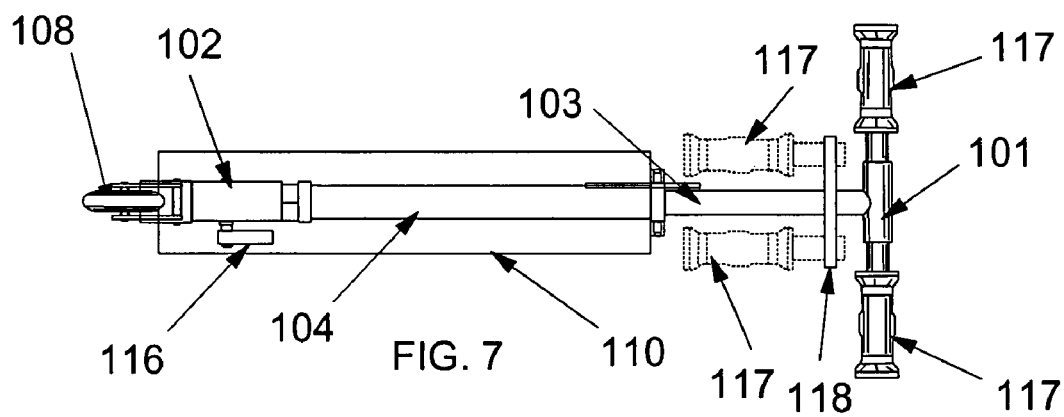

Consider that scooter 100 is capable of being folded down so that steering post 102 is near to the top surface of running board 110. FIGS. 6 and 7 respectively show side and top views of scooter 100 in a folded down position so that it is easily stored or carried. Upper tube 103 is shown contained in part within tube 105 and handlebars 101 may be dismantled into handlebar sections 117 and secured to holder 118, thereby further reducing an overall storage outline of scooter 100.

Figure 8:
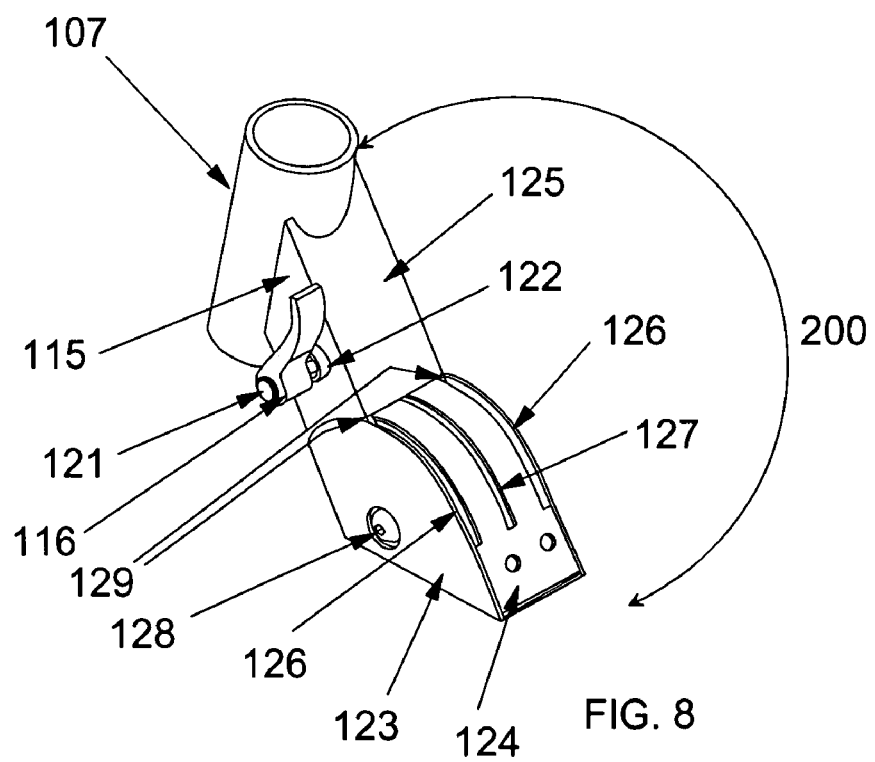
FIG. 8 is a perspective view of the folding means.

FIG. 8 shows a rear and upper perspective view of the folding means of the invention. An upper part of the folding means is fixed to a rear, outside surface of tube 107 and is rotatably connected with a lower part of the folding means fixed to a front, top surface of the running board. The upper part is rotatable along path 200. A protective housing encloses the lower part comprising a base piece 114 that is covered by a slotted roof piece 124. A protective housing also encloses the upper part comprising a upper latch piece 115 that is covered by an upper roof piece 125.

Three slots are shown formed by the connection of roof piece 124 to base piece 114. A first slot 127 provides for free front to rear travel of a long armature enclosed within the protective housing, while side slots 126 are defined by lateral openings in roof piece 124 and a top edge of side walls 123. Slots 126 provide for free front to rear travel of side wall extensions 129 of upper latch piece 115, which extensions 129 extend down to a base pin 128 securing the upper part of the folding means to the lower part. It can be readily appreciated that movement of the folding means along path eliminates the possibility that a user could trap their finger or hand in the folding mechanisms of scooter 100 in moving along path 200. The convex and planar outer upper surface of roof piece 124 are swept by a lower edge of upper roof piece 125 when the folding means are moving along path 200, thereby preventing a user's appendages from captured between the scissoring mechanisms within the protective housings.

A latch lever 121 extends from a lateral side of a side wall of upper latch piece 115 from a rotating pin and is held apart from that side wall by spacer ring 122.

Various portions of the folding means are now shown and described with reference to perspective drawings in FIGS. 9 through 12.

Figure 9:
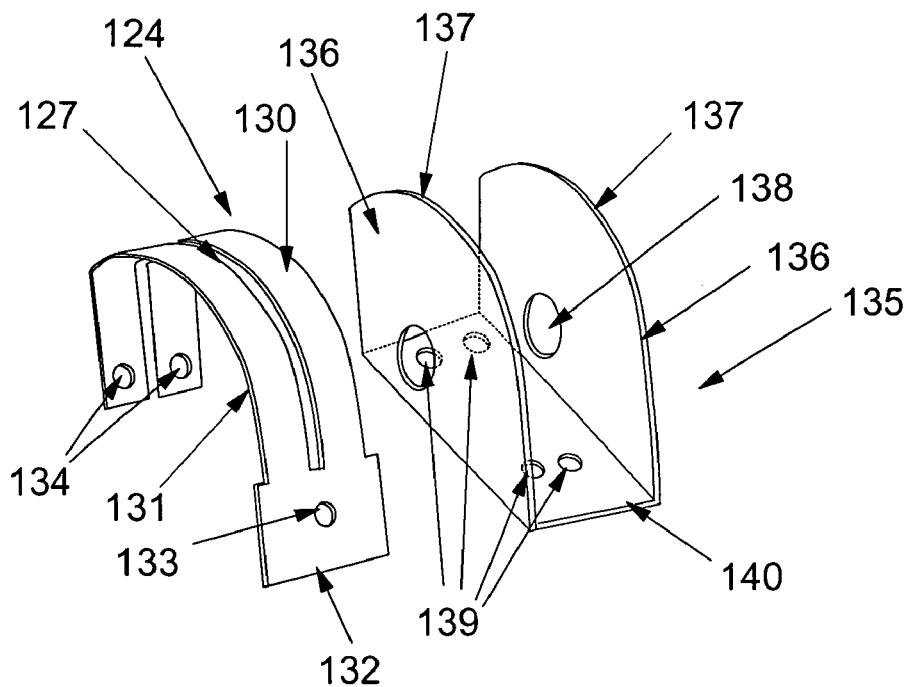
FIG. 9 is an exploded and perspective view of the base piece and the lower roof piece.

FIG. 9 shows roof piece 124 separated from an upside down and U-shaped base piece 135 with a bottom plate 140 and side flanges 136 which is secured to a top and front surface of the running board at the bottom plate 140 via bolt holes 139. Upward facing side flanges 136 of the base piece 135 have edges 137 which in part define slots 126 of FIG. 8 when roof piece 124 is secured to base piece 135. Base piece 135 further comprises two aligned holes 138 for access to a base pin. Roof piece 124 defines a slot 127 with strips 130 and 131 that extend arcuately forward from connector plate 132. Roof piece 124 comprises holes 133 and 134 for its connection to the base piece 135.

Figure 10:
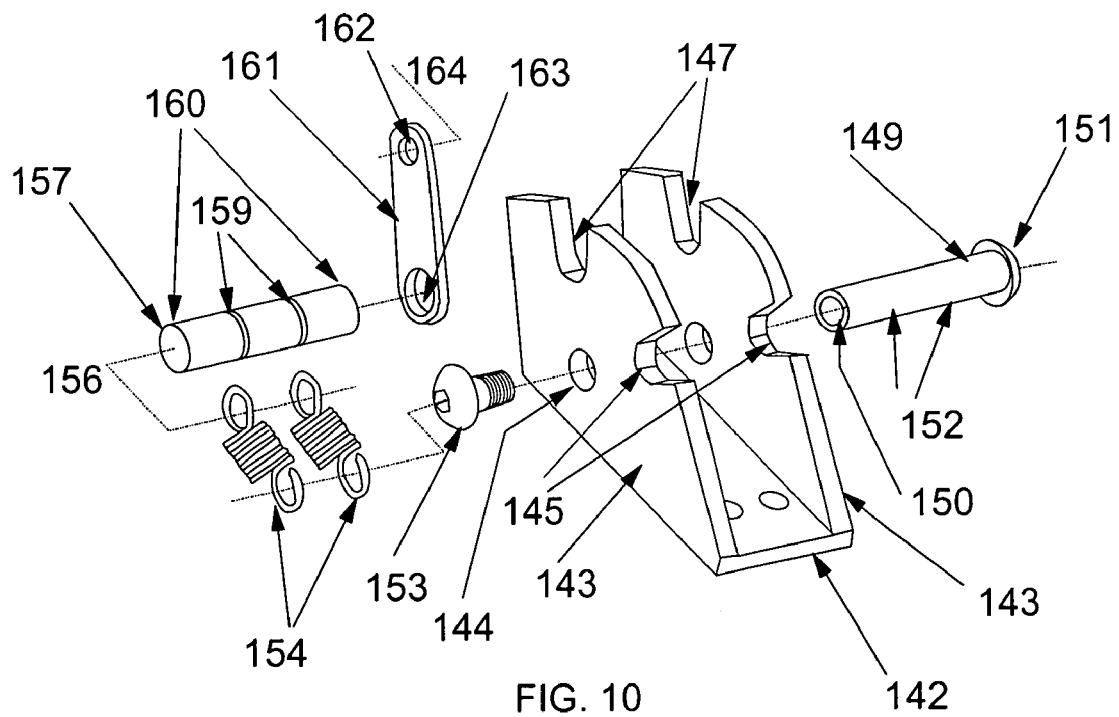
FIG. 10 is an exploded and perspective view of the lower latch piece, base pin (and securing screw), springs, latch pin and long armature and the upper roof piece.

Secured to an upward facing surface of the bottom plate 140 via holes aligned with holes 139 of base piece 135 and located between the side flanges 136 of the base piece 135 is a second upside down U-shaped piece and associated mechanism in FIG. 10.

FIG. 10 is a top perspective view of the second upside down U-shaped piece, a lower latch piece 141, base pin 149 (and securing screw 153), springs 154, latch pin 157, and long armature 161. Lower latch piece 141 comprises another bottom plate 142 and side flanges 143 directed upward. The side flanges 143 of the lower latch piece 141 have two sets of aligned notches (front notches 147 and rear notches 145) separated by upper edges 145. Notches 145 and 147 are adapted to removeably receive a horizontal latch pin 157. The latch pin 157 is urged into one of the sets of aligned notches 145 or 147 by means of springs 154 connecting a mid section of the latch pin 157 with the base pin 149 secured in the lower latch piece 141. A horizontal base pin 157 is secured in aligned holes 144 in the side flanges 143. When the lower latch piece 141 is secured to the base piece 135 (FIG. 9), two narrow upper latch piece spaces are formed between inner surfaces of the side flanges 136 of the base piece 135 (FIG. 9) and outer surfaces of the side flanges 143 of the lower latch piece 141.

FIG. 10 further shows base pin 149 comprises a head 151 a shaft 152 where ends of springs 154 attach, and a threaded bore 150 to receive securing screw 153. Springs 154 each comprise looped ends to connect base pin 149 and grooves 159 of latch pin 157. Latch pin 157 comprises latching ends 160 that are adapted to engage notches 145 and 147 of lower latch piece 141 and which are guided by latch pin slots described below for an upper latch piece. Long armature 161 comprises holes 162 and 163, where hole 163 is adapted to receive latch pin 157 along axis 156 and be secured to latch pin 157 between grooves 159.

Secured at a lower end by the base pin 149 and rotatably movable within the upper latch piece spaces is a third U-shaped piece. Referring now to FIG. 11, an upper latch piece 165 comprises another bottom plate 170 and side flanges 166. The concave side of the upper latch piece 165 is directed rearward so that a top surface of the bottom plate 170 always faces a rider when the steering post is in an upright position. Lower engaging ends of the side flanges 166 of the upper latch piece 165 fit into the two narrow upper latch piece spaces so that the base pin 149 (FIG. 10) can secure together the lower latch piece 141 (FIG. 10) and the upper latch piece 165 (FIG. 11). The upper latch piece 165 is rotatable about its holes 167 wherein is fixed the base pin at the engaging ends of the upper latch piece 165.

The upper latch piece 165 connects at a post support end via edges 188 with the lower tube 107 (FIG. 8) of the steering post. Referring again to FIG. 11, side flanges 166 comprise a middle part with two aligned latch pin slots 168 opposite one another on the side flanges 166. Side flanges 166 also comprise two aligned holes 169 for receiving a rotating pin described below. FIG. 11 shows an upper roof piece 172 which is adapted to connect with holes 171 in the bottom plate 170 via threaded extensions 174 so that upper roof piece entirely covers an upper part of the opening formed between top edges of side flanges 166. Arcuate cutout 173 is adapted to mating fit against a surface of tube 107 (FIG. 8). A lower edge of upper roof piece 172 is adapted to sweep a top surface of roof piece 124 (FIG. 9) when the folding means are assembled.

FIG. 12 is a perspective view of a rotating pin 182, its locking washers 187, a latch lever 116, a spacer 122, dual short armatures 179, and an armature connecting pin 178. Rotating pin 182 comprises two flattened sides 183 adapted to lockingly engage with longitudinal slots 180 of short armatures 179 and a similarly formed locking bore 177 of latch lever 116 so that rotation of the rotating pin 182 by a user depressing latch lever 116 necessarily causes a corresponding rotation in short armatures 179. Rotating pin 182 further comprises slots 184 adapted to receive locking washers 187. Short armatures 179 are adapted to be located at about the center of rotating pin 182 and separated only by the width of an upper end of long armature 161 (FIG. 10), which does not connect directly with the rotating pin 182.

Referring again to FIG. 12, short armatures are shown with holes 181 adapted to receive armature connecting pin 178. Armature connecting pin 178 connects the lower ends of short armatures 179, spacing them apart by a secured upper end of the long armature 161 (FIG. 10), whose hole 162 receives the armature connecting pin 178 along axis 164. Referring again to FIG. 12, latch lever 116 comprises a user lever end 175 and a connecting end 176 which defines bore 177.

Excepting the roof pieces of the protective housing, FIGS. 13 through 16 show the folding means assembled and operating to move the steering post (not shown) from an upright to a folded down position.

FIG. 13 is a side view of the invention folding means. FIG. 14 shows a rear and broken away view of the folding means of FIG. 13. In FIG. 14, base piece 135 is shown secured to its bottom plate lower latch piece 141, forming upper latch piece spaces between side flanges 136 and side flanges 143, wherein are rotatably fixed ends of side flanges 166 of upper latch piece 165. When the upper latch piece 165 is connected with the lower latch piece 141 via the base pin 149, the upper latch piece is rotatable along the path 200 (FIG. 8). Ends of latch pin 157 is shown secured in front notch 147 and guided thereto by latch pin slots 168, where said latch pin is urged downward by its connection to the base pin 149 via springs 154. Long armature 161 connects a center of latch pin 157 with a center of armature connecting pin 178, which upper end of long armature 161 is bracketed by lower ends of short armatures 179. Upper ends of short armatures 179 are secured to a middle portion of rotating pin 182. Rotating pin 182 is secured within opening in side flanges 166 and is rotatable by pressing on a top surface of latch lever 116. Spacer 122 spaces latch lever 116 from an outside surface of a side flange 166.

FIG. 14 shows the folding means of FIGS. 13 and 14 after a user has depressed latch lever 116 in direction 189. Short armatures 179 rotate about rotating pin 182 lifting their lower ends and thereby lifting the upper connected end of long armature 161, which in turn lifts the connected latch pin 157 out of notch 147. Springs 154 strongly urge latch pin 157 downward but is resisted by the tendency of the flattened sides of rotating pin 182 to cause said pin to remain in the rotated position shown in FIG. 15. FIG. 16 shows the folding means of FIG. 15 rotated back to a folded down position, thereby aligning latch pin 157 over notch 145. In that position, latch pin 157 can be released from the position shown in FIG. 16 and into notch 145 by lifting upward on latch lever 116.

FIG. 17 is a top view of running board 110 comprising a top surface 190, whose front portion comprises holes 191 to which the base piece and lower latch piece are secured by bolts or screws. A rear portion of board 110 comprises a wheel slot 193 defined by extensions 192. Extensions 192 comprise axle holes for receiving and securing therein an axle of the rear wheel.

I claim:
1. A scooter with folding means comprising:
(a) a steering post having a top end with handlebars extending side to side therefrom and a bottom end fixed to a front wheel support, where a support tube supports a lower part of the steering post;
(b) a front wheel rotatably attached to the front wheel support;
(c) a running board having a length adapted to support the weight of a user standing on a top surface of the running board, where a rear part of the running board supports an axle of a rear wheel, whereby the front and rear wheels are aligned and cooperate so that the scooter rolls forward when the running board is supportively connected with the support tube;
(d) folding means supportively connecting the running board with the support tube so that the steering post is releasably fixed in an upright position and can be folded down so that the steering post lies adjacent to the top surface of the running board; and
(e) the folding means further comprising a protective housing around a mechanism enclosed within it;
(f) an upside down U-shaped base piece comprising a first bottom plate and first side flanges defining a first concavity, the U-shaped piece fixed to a top surface of the running board by the first bottom plate
(g) an upside down U-shaped lower latch piece comprising a second bottom plate and second side flanges fixed by the second bottom plate to a top surface of the first bottom plate, where the first and second side flanges define two upper latch piece spaces;
(h) a U-shaped upper latch piece comprising a third bottom plate and third side flanges, which define a second concavity, said upper latch piece rotatable fixed at lower ends of the third side flanges in the upper latch piece spaces to the second side flanges by a base pin and upper ends of the third side flanges are fixed to the support tube, where the third side flanges define aligned and elongated latch pin slots and a rotating pin is rotatable fixed in openings defined the third side flanges, said rotating pin extending beyond an outside surface of a third side flange to support a latch lever adapted to be rotated by a user to cause a rotation in the rotating pin:

(i) the second side flanges further comprising upper arcuate edges and two sets of laterally aligned notches, front notches near to a front of the scooter and rear notches rearward of the front notches;

(j) a latch pin with two ends extending normal and into the latch pin slots and adjacent to an inside surface of the first side flanges, said latch pin urged toward the base pin by springs connecting them so that the latch pin is thereby urged into one or the sets of notches when the latch pin is moved thereto;

(k) two short armatures fixed at one end to a middle part of the rotating pin and fixed at another end to an armature connecting pin so that rotation of the rotating pin causes a rotation of the short armatures;

(l) a long armature rotatable connecting a center part of both the armature connecting pin and the latch pin, whereby rotation of the latch lever by a user causes the latch pin to lift upward from engaging top edges of the second side flanges and the sets of notches;

(m) a lower roof piece enclosing the first concavity, where a center slot is defined in the lower roof piece and is adapted to permit free front to rear travel of the lone armature and two side slots are defined by side edges of the lower roof piece and are adapted to permit free front to rear travel of the third side flanges; and (n) an upper roof piece enclosing the second concavity.

2. The scooter of claim 1 wherein the lower roof piece and base piece enclose therein the lower latch piece, the most of the base pin, the latch pin, springs, a lower part of the upper latch piece, and a portion of the long armature.

3. The scooter of claim 2 wherein the upper roof piece, an upper part of the upper latch piece, and a part of the outside surface of the support tube enclose therein most of the rotating pin, the short armatures, the armature connecting pin, and a portion of the long armature.

4. The scooter of claim 3 wherein a lower edge of the upper roof piece is always adjacent to a top surface of the lower roof piece when the scooter is moved from the upright to the folded down position.

5. The scooter of claim 4 wherein a protective housing comprises the base piece, the lower roof piece, the upper latch piece, the upper roof piece and a portion of the support tube so that a user cannot be harmed by the folding means when the scooter is moved from the upright to the folded down position.

\* \* \* \* \*